(12) United States Patent
Shigematsu et al.

(10) Patent No.: US 10,574,039 B2
(45) Date of Patent: Feb. 25, 2020

(54) PEELING APPARATUS AND PEELING METHOD

(71) Applicants: HONDA MOTOR CO., LTD., Tokyo (JP); SHINKO ELECTRIC INDUSTRIES CO., LTD., Nagano-shi, Nagano (JP)

(72) Inventors: Hideki Shigematsu, Tochigi (JP); Masafumi Saito, Tochigi (JP); Keita Miyashita, Tochigi (JP); Ryuzo Sakamoto, Tochigi (JP); Hiroyuki Miyajima, Nagano (JP); Akio Komamura, Nagano (JP)

(73) Assignees: HONDA MOTOR CO., LTD, Tokyo (JP); SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 177 days.

(21) Appl. No.: 15/706,802

(22) Filed: Sep. 18, 2017

(65) Prior Publication Data

US 2018/0083428 A1 Mar. 22, 2018

(30) Foreign Application Priority Data

Sep. 20, 2016 (JP) .................... 2016-183110

(51) Int. Cl.
*H02G 1/12* (2006.01)
*H01B 15/00* (2006.01)

(52) U.S. Cl.
CPC .......... *H02G 1/126* (2013.01); *H01B 15/006* (2013.01); *H02G 1/127* (2013.01); *H02G 1/1285* (2013.01); *Y02W 30/821* (2015.05)

(58) Field of Classification Search
CPC .......... H02K 15/04; H02G 1/12; H02G 1/126; H02G 1/127; H02G 1/1285; H01B 15/006; Y02W 30/821; E21B 19/16; B25B 13/48; B25B 13/481; B25B 13/5091; B25B 17/00
See application file for complete search history.

(56) References Cited

U.S. PATENT DOCUMENTS

| 5,142,950 A * | 9/1992 | Takano ................ H02G 1/1268 29/825 |
| 6,487,939 B1 * | 12/2002 | Cowher ............. G02B 6/02123 81/9.4 |
| 2015/0052736 A1 * | 2/2015 | Hayashi ............. H02K 15/0421 29/596 |

FOREIGN PATENT DOCUMENTS

| JP | 5681248 | 3/2015 |
| JP | 2017-131023 | * 7/2017 |

* cited by examiner

*Primary Examiner* — Robert J Scruggs
(74) *Attorney, Agent, or Firm* — Rankin, Hill & Clark LLP

(57) ABSTRACT

A peeling apparatus 1 includes a first peeling die and a second peeling die respectively including a pair of cutting blades 251 that peels the insulating film by being moved in a direction perpendicular to an axial direction of the conductive wire material 2 to cut the insulating film, and a support die 253 that supports a side surface of the conductive wire material 2 from a downstream side in a moving direction of the cutting blades 251 at the time of cutting by the cutting blades 251, the support die 253 of the first peeling die including a convex portion 2533 protruding toward the conductive wire material 2.

5 Claims, 5 Drawing Sheets

PEELING APPARATUS AND PEELING METHOD

This application is based on and claims the benefit of priority from Japanese Patent Application No. 2016-183110, filed on 20 Sep. 2016, the content of which is incorporated herein by reference.

BACKGROUND OF THE INVENTION

Field of the Invention

The present invention relates to a peeling apparatus and peeling method for peeling the insulating film of a conductive wire material constituted by an electrical conductor coated with the insulating film.

Related Art

Conventionally, apparatuses that peel an insulating film and cut a coil segment every time a conductive wire material constituted by an electrical conductor having a conductive portion coated with the insulating film is fed, the conductive portion being made of copper and the like, are known (for example, see Patent Document 1). In the peeling process performed in the apparatuses, a pair of peeling blades peels the insulating film of the conductive wire material having a straight angle shape in cross-section, that is, a rectangular shape in cross-section, two surfaces at a time, the two surfaces having a parallel positional relationship in section view.

Patent Document 1: Japanese Patent No. 5681248

SUMMARY OF THE INVENTION

In the apparatus described in Patent Document 1, the pair of peeling blades passes along the sides of the conductive wire material while peeling the insulating film on two surfaces of the conductive wire material. At this time, the conductive wire material is pulled by the peeling blades, and a concave portion depressed in the moving direction of the peeling blades is formed in a portion of the conductive wire material after the insulating film on the two surfaces of the conductive wire material is peeled. If the portion of the conductive wire material where the insulating film has been peeled has a shape biased from the axial center of the conductive wire material, the concave portion does not come into contact with the peeling blades and the insulating film remains without being peeled when next time the insulating film on the other two surfaces where the insulating film has not yet been peeled is peeled.

An objective of the present invention is to provide a peeling apparatus and a peeling method for suppressing, regarding a portion of a conductive wire material, where an insulating film on two surfaces of the conductive wire material has been peeled by peeling blades, formation of a shape biased from an axial center of the portion of the conductive wire material.

To achieve the above objective, the present invention provides a peeling apparatus (for example, a coil segment manufacturing apparatus 1 described below) that peels an insulating film (for example, an insulating film 8 described below) of a conductive wire material (for example, a conductive wire material 2 described below) constituted by an electrical conductor (for example, a conductive portion 7 described below) coated with the insulating film, the conductive wire material having a quadrilateral cross-section, and including a first side surface (for example, a first side surface 3 described below) and a second side surface (for example, a second side surface 4 described below) respectively corresponding to one pair of opposite sides of the quadrilateral, and a third side surface (for example, a third side surface 5 described below) and a fourth side surface (for example, a fourth side surface 6 described below) respectively corresponding to the other pair of opposite sides, the peeling apparatus including: a first peeling die (for example, a peeling die 23 described below) that peels at once the insulating film on the third side surface and the fourth side surface of the conductive wire material; and a second peeling die (for example, a peeling die 26 described below) installed downstream of the first peeling die in a feed direction into which the conductive wire material is fed, and which peels at once the insulating film on the first side surface and the second side surface of the same portion as the portion of the conductive wire material, the portion where peeling of the insulating film by the first peeling die has been made, wherein the first peeling die and the second peeling die respectively include a pair of cutting blades (for example, peeling blades 28 and 251) that peels the insulating film by being moved in a direction perpendicular to an axial direction of the conductive wire material to cut the insulating film, and a support die (for example, a die 253 described below) that supports a side surface of the conductive wire material from a downstream side in a moving direction of the cutting blades at the time of cutting by the cutting blades, and the support die of the first peeling die includes a convex portion (for example, a convex portion 2533 described below) protruding toward the conductive wire material.

When the insulating film on two facing surfaces of the conductive wire material is peeled at once, the conductive wire material is pulled in the moving direction of the cutting blades, and a concave portion depressed in the moving direction of the cutting blades is formed in the conductive wire material. Therefore, the conductive wire material becomes a conductive wire material having a shape biased with respect to an axial center of the conductive wire material in such a manner to include a concave portion in a certain surface and a plane in a surface facing the certain surface. If the conductive wire material has the shape biased with respect to the axial center, a portion where the concave portion is formed does not come into contact with the cutting blades, and the insulating film on the portion is not peeled and the film remains, when other two surfaces where the insulating film has not yet been peeled are peeled in the next process However, according to the present invention, the insulating film is peeled while the conductive wire material is supported by the support die including the convex portion in the first peeling die, and thus concave portions are formed on both a downstream side and an upstream side of the conductive wire material in the moving direction of the cutting blades, and the insulating film on the other two surfaces can be peeled in a state of a symmetrical shape with respect to the axial center of the conductive wire material. Therefore, the cutting blades uniformly come into contact with the conductive wire material when the insulating film on the other two side surfaces is peeled by the second peeling die, and thus any remaining of the film can be eliminated.

Further, the convex portion has a shape curved toward the conductive wire material. Therefore, the concave portion formed in the conductive wire material by the convex portion can be made to a curved shape. With the configuration, the conductive wire material can be made to a shape symmetrically curved with respect to the axial center of the conductive wire material, and the cutting of the insulating film by the cutting blades can be facilitated.

Further, to achieve the above objective, the present invention provides a peeling method of peeling an insulating film (for example, an insulating film 8 described below) of a conductive wire material (for example, a conductive wire material 2 described below) constituted by an electrical conductor (for example, a conductive portion 7 described below) coated with the insulating film, the conductive wire material having a quadrilateral cross-section, and including a first side surface (for example, a first side surface 3 described below) and a second side surface (for example, a second side surface 4 described below) respectively corresponding to one pair of opposite sides of the quadrilateral, and a third side surface (for example, a third side surface 5 described below) and a fourth side surface (for example, a fourth side surface 6 described below) respectively corresponding to the other pair of opposite sides, the peeling method including: a first peeling process of moving a pair of cutting blades (for example, peeling blades 251 described below) in a direction perpendicular to an axial direction of the conductive wire material to peel at once the insulating film on the third side surface and the fourth side surface of the conductive wire material; and a second peeling process of peeling at once the insulating film on the first side surface and the second side surface of a same portion as a portion of the conductive wire material, the portion where peeling of the insulating film by the first peeling process has been made, after the first peeling process, and in the first peeling process, peeling the insulating film while pressing and deforming the conductive wire material toward an opposite direction to a moving direction of the cutting blades in cutting by the cutting blades.

According to the present invention, in the first peeling process, the conductive wire material is pressed and deformed toward the opposite direction to the moving direction of the cutting blades. Therefore, even if the conductive wire material is pulled by the cutting blades and a concave portion depressed in the moving direction of the cutting blades is formed in the conductive wire material, the formation of the concave portion is suppressed by the amount of the conductive wire material pressed and deformed toward the opposite direction to the moving direction of the cutting blades, and a surface facing the concave portion has a concave portion according to the amount of pressing. Therefore, the conductive wire material having a symmetrical shape with respect to the axial center of the conductive wire material can be formed. With the configuration, the cutting blades uniformly come into contact with the conductive wire material when the insulating film on the other two side surfaces is peeled in the second peeling process, and thus any remaining of the film can be eliminated.

Further, in the first peeling process, the conductive wire material is arranged on a support side (for example, a die 253 described below) including a convex portion (for example, a convex portion 2533 described below) in a conductive wire material contact surface, the conductive wire material is pressed by a pressing member (for example, a pressing member 252 described below) that regulates movement of the conductive wire material from a side facing the support die, and the insulating film on the third side surface and the fourth side surface of the conductive wire material is peeled while the conductive wire material is deformed along the shape of the convex portion.

Therefore, the peeling is performed in a state where the conductive wire material is fixed between the convex portion provided in the support die and the pressing member, whereby there is no position aberration of the conductive wire material with respect to the cutting blades, and accurate peeling of the insulating film can be performed. Further, the configuration of pressing the conductive wire material against the convex portion of the support die by the pressing member is employed. Therefore, the conductive wire material can be deformed into the shape along the convex portion with the simple structure.

Further, the convex portion has a shape curved toward the conductive wire material. Therefore, the concave portion formed in the conductive wire material by the convex portion can be made to a curved shape. With the configuration, the conductive wire material can be made to a shape symmetrically curved with respect to the axial center of the conductive wire material, and cutting of the insulating film by the cutting blades can be facilitated.

According to the present invention, a peeling apparatus and a peeling method for suppressing, regarding a portion of a conductive wire material, where an insulating film on two surfaces of the conductive wire material has been peeled by peeling blades, formation of a shape biased from an axial center of the portion of the conductive wire material, can be provided.

DETAILED DESCRIPTION OF THE INVENTION

Figure 1:
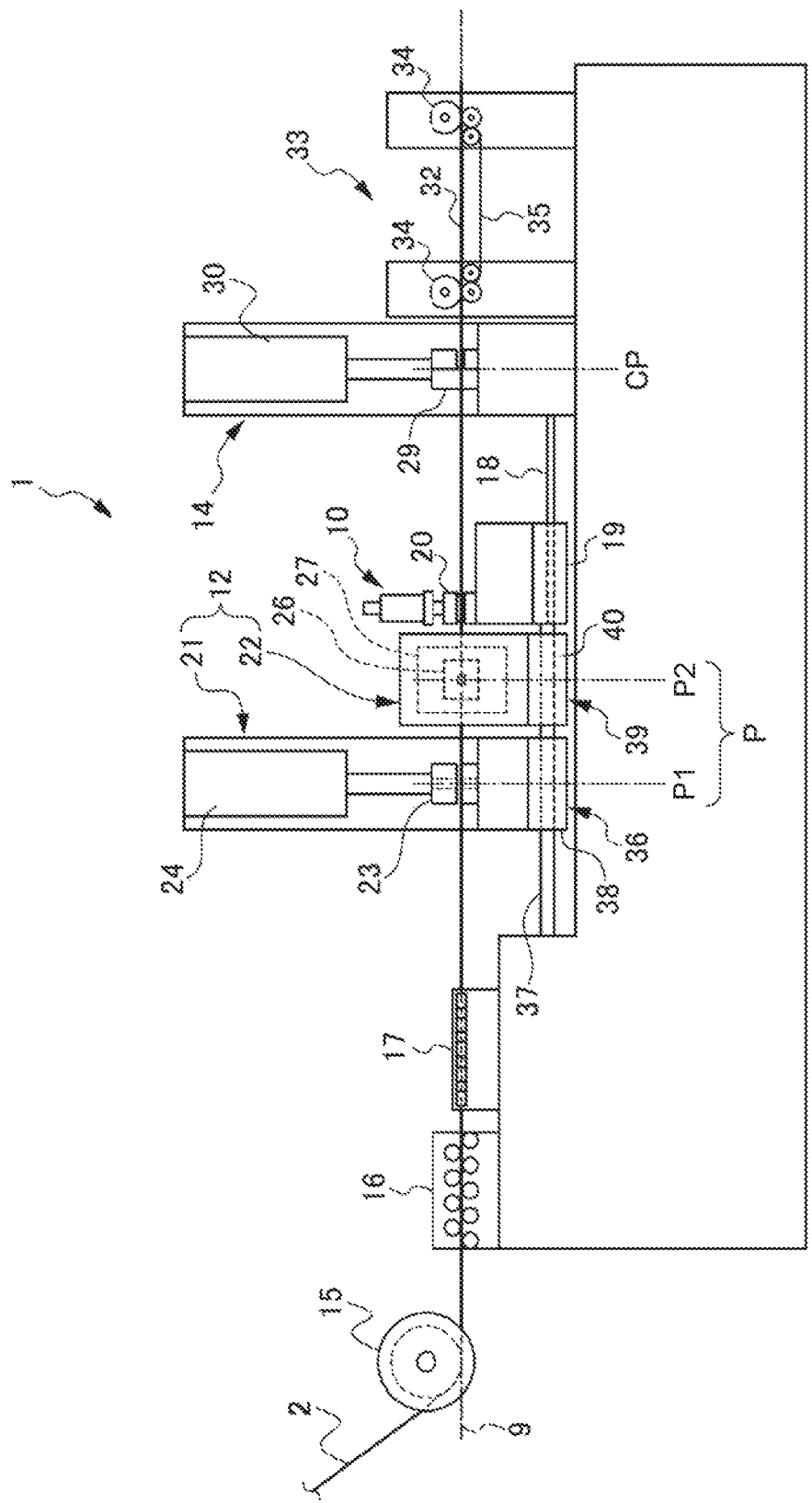
FIG. 1 is a schematic side view illustrating a coil segment manufacturing apparatus according to an embodiment of the present invention.
Figure 2:
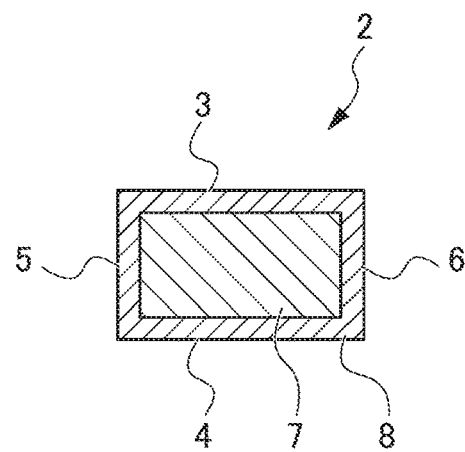
FIG. 2 is a sectional view of a conductive wire material to be supplied to a coil segment manufacturing apparatus according to an embodiment of the present invention.
Figure 3A:
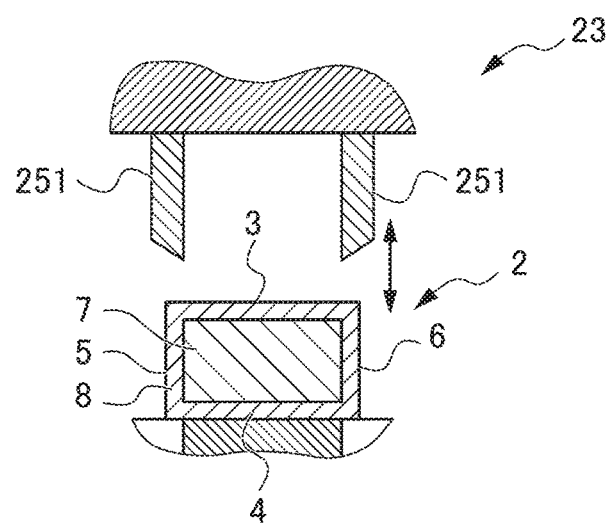
FIGS. 3(*a*) and 3(*b*) are diagrams illustrating a state of peeling an insulating film of a coil segment manufacturing apparatus according to an embodiment of the present invention, and FIG. 3(*a*) is a front sectional view illustrating a state of peeling the insulating film in a first peeling section and FIG. 3(*b*) is a front sectional view illustrating a state of peeling the insulating film in a second peeling section.
Figure 3B:
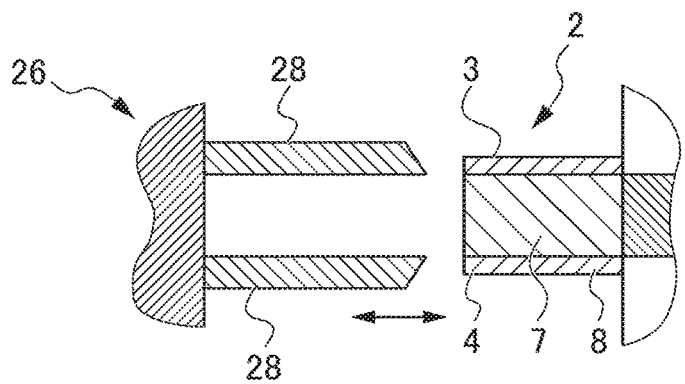

Hereinafter, embodiments of the present invention will be described using the drawings. FIG. 1 is a schematic side view illustrating a coil segment manufacturing apparatus 1 according to an embodiment of the present invention. FIG. 2 is a sectional view of a conductive wire material 2 to be supplied to the coil segment manufacturing apparatus 1 according to an embodiment of the present invention. FIGS. 3(a) and 3(b) are diagrams illustrating a state of peeling an insulating film 8 of the coil segment manufacturing apparatus 1 according to an embodiment of the present invention. FIG. 3(a) is a front sectional view illustrating a state of peeling the insulating film 8 in a first peeling section 21, and FIG. 3(b) is a front sectional view illustrating a state of peeling the insulating film 8 in a second peeling section 22.

As illustrated in FIG. 1, the coil segment manufacturing apparatus 1 of an embodiment is used to manufacture, from a conductive wire material 2 for a coil, to which an insulating film 8 has been applied, a coil segment in which the insulating film 8 on both end portions of the conductive wire material 2 is peeled. The coil segment manufacturing apparatus 1 constitutes a peeling apparatus of the insulating film 8.

As the conductive wire material 2, a flat wire is used. That is, as illustrated in FIG. 2, the cross-section of the conductive wire material 2 has a rectangular shape. The conductive wire material 2 includes a first side surface 3 and a second side surface 4 corresponding to long sides of the rectangle, and a third side surface 5 and a fourth side surface 6 corresponding to short sides of the rectangle. The conductive wire material 2 is constituted by a conductive portion 7 as an electrical conductor made of copper and the like, and the insulating film 8 that coats the periphery of the conductive portion 7.

As illustrated in FIG. 1, the coil segment manufacturing apparatus 1 includes a conductive wire material feed section 10 that feeds the conductive wire material 2 along a feed path 9, a coat peeling section 12 that peels the insulating film 8 from the conductive wire material 2 at a peeling position P on the feed path 9, and a conductive wire material cutting section 14 that cuts the conductive wire material 2 at a cutting position CP on the feed path 9. The conductive wire material 2 is supplied from a conductive wire material wind-up machine (not illustrated) to the coil segment manufacturing apparatus 1 and is introduced onto the feed path 9 via a roller 15.

A thickness-direction correction unit 16 and a width-direction correction unit 17 that linearly correct the introduced conductive wire material 2 are provided between the roller 15 and the coat peeling section 12. The thickness-direction correction unit 16 corrects the introduced conductive wire material 2 in the thickness direction. The width-direction correction unit 17 corrects the introduced conductive wire material 2 in the width direction.

The conductive wire material feed section 10 includes a traveling stage 19 that travels on a rail 18 along the feed path 9 propelled by a linear motor, and a clamp unit 20 provided on the traveling stage 19, and which clamps or unclamps the conductive wire material 2. The conductive wire material feed section 10 repeats a feed operation to clamp the conductive wire material 2, move the traveling stage 19 in the downstream direction of the feed path 9 by a predetermined feed amount, unclamp the conductive wire material 2, and put the traveling stage 19 back in the upstream direction, thereby to feed the conductive wire material 2 in the downstream direction.

The coat peeling section 12 includes a first peeling section 21 that peels the insulating film 8 (see FIG. 2) on the third side surface 5 and the fourth side surface 6 of the linearly corrected conductive wire material 2, and a second peeling section 22 that peels the insulating film 8 on the first side surface 3 and the second side surface 4.

The first peeling section 21 includes a peeling die 23 as a first peeling die for cutting off and peeling the insulating film 8 of the conductive wire material 2, and a die drive unit 24 that drives the peeling die 23. As illustrated in FIG. 3(a), the peeling die 23 includes two peeling blades 251. The die drive unit 24 moves the peeling blades 251 as cutting blades downward as a direction perpendicular to the axial direction of the conductive wire material 2 along the third side surface 5 and the fourth side surface 6 of the conductive wire material 2, thereby to peel at once the insulating film 8 in corresponding portions on the third side surface 5 and the fourth side surface 6 in such a way to cut off the insulating film 8.

The second peeling section 22 is arranged downstream of the first peeling section 21 in the feed direction of the conductive wire material 2. The second peeling section 22 includes a peeling die 26 as a second peeling die for cutting off and peeling the insulating film 8, and a die drive unit 27 that drives the peeling die 26. As illustrated in FIG. 3(b), the peeling die 26 includes two peeling blades 28 and a die as a support die (not illustrated). The die supports the side surface of the conductive wire material 2 from the downstream side in the moving direction of the peeling blades 28 at a time of cutting by the peeling blades 28. In this state, the die drive unit 27 moves the two peeling blades 28 as cutting blades in the direction perpendicular to the axial direction of the conductive wire material 2 along the first side surface 3 and the second side surface 4 of the conductive wire material 2, thereby to peel at once the insulating film 8 in corresponding portions on the first side surface 3 and the second side surface 4 in such a way to cut off the insulating film 8. That is, the die drive unit 27 peels at once the insulating film 8 on the first side surface 3 and the second side surface 4 of the same portion as the portion of the conductive wire material 2 where peeling of the insulating film 8 by the peeling die 23 has been made.

The conductive wire material cutting section 14 includes a cutting die 29 for cutting the conductive wire material 2, and a die drive unit 30 that drives the cutting die 29. The die drive unit 30 drives the cutting die 29 to cut the conductive wire material 2 sequentially fed by the conductive wire material feed section 10.

The peeling position P at which the insulating film 8 is peeled includes a first peeling position P1, and a second peeling position P2 downstream of the first peeling position P1. Peeling of the insulating film 8 by the first peeling section 21 is performed at the first peeling position P1. Peeling of the insulating film 8 by the second peeling section 22 is performed at the second peeling position P2.

Cutting of the conductive wire material 2 by the conductive wire material cutting section 14 is performed at the cutting position CP downstream of the first peeling position P1 and the second peeling position P2. A transport section 33 that transports the portion separated from the conductive wire material 2 through the cutting to the next process as a coil segment 32 is provided downstream of the conductive wire material cutting section 14. The transport section 33 is constituted by a conveyance roller 34 and a conveyor 35.

The first peeling section 21 is provided with a first peeling position change section 36 that changes the first peeling position P1 in synchronization with switching of the feed amount in the conductive wire material feed section 10. The first peeling position change section 36 includes a first stage 38 slidably provided on a rail 37. The first stage 38 supports the first peeling section 21 and is moved on the rail 37 by a linear motor (not illustrated) to change the first peeling position.

Note that, as means to move the first stage 38 on the rail 37, a ball screw and a servomotor that rotates a nut or a screw shaft of the ball screw may be employed in place of the linear motor.

The second peeling section 22 is provided with a second peeling position change section 39 that changes the second peeling position P2 in synchronization with switching of the feed amount in the conductive wire material feed section 10. The second peeling position change section 39 is constituted by a second stage 40 slidably provided on the rail 37. The second stage 40 supports the second peeling section 22 and is driven on the rail 37 by a linear motor (not illustrated) to change the second peeling position P2.

Change of the first peeling position P1 and the second peeling position P2 is performed by an appropriate change amount at appropriate timing such that cutting of the conductive wire material 2 at the cutting position CP is performed in the center of the portion where the insulating film 8 has been peeled.

Figure 4:
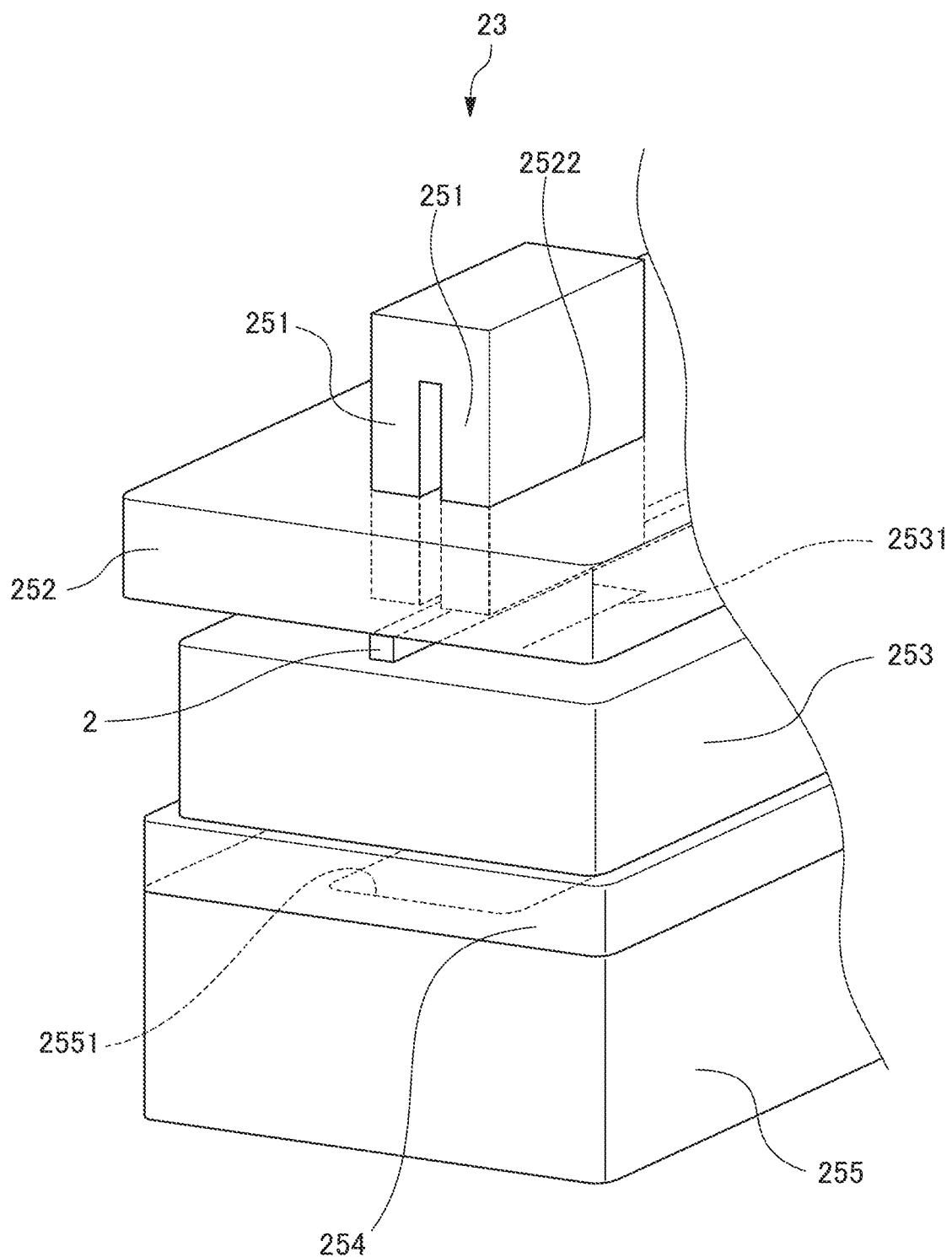
FIG. 4 is a schematic perspective view illustrating a peeling die of a first peeling section of a coil segment manufacturing apparatus according to an embodiment of the present invention.

Next, the configuration of the peeling die 23 of the first peeling section 21 will be described in detail. FIG. 4 is a schematic perspective view illustrating the peeling die 23 of the first peeling section 21 of the coil segment manufacturing apparatus 1 according to an embodiment of the present invention.

The peeling die 23 includes the peeling blades 251, a pressing member 252, a die 253 as a support die, a spacer 254, and a die set 255. The die 253 is arranged on the die set 255 through the spacer 254. A through hole 2551 is formed in the die set 255, and a through hole (not illustrated) is also formed in a portion of the spacer 254, the portion facing the through hole 2551 of the die set 255. The conductive wire material 2 fed from the width-direction correction unit 17 is arranged to face the upper surface of the die 253 illustrated in FIG. 4. The die 253 supports a side surface of the conductive wire material 2 (the lower surface of the conductive wire material 2 illustrated in FIG. 4) from the downstream side in the moving direction of the peeling blades 251 at the time of cutting by the peeling blades 251, that is, from the lower side to the upper side illustrated in FIG. 4.

Figure 5:
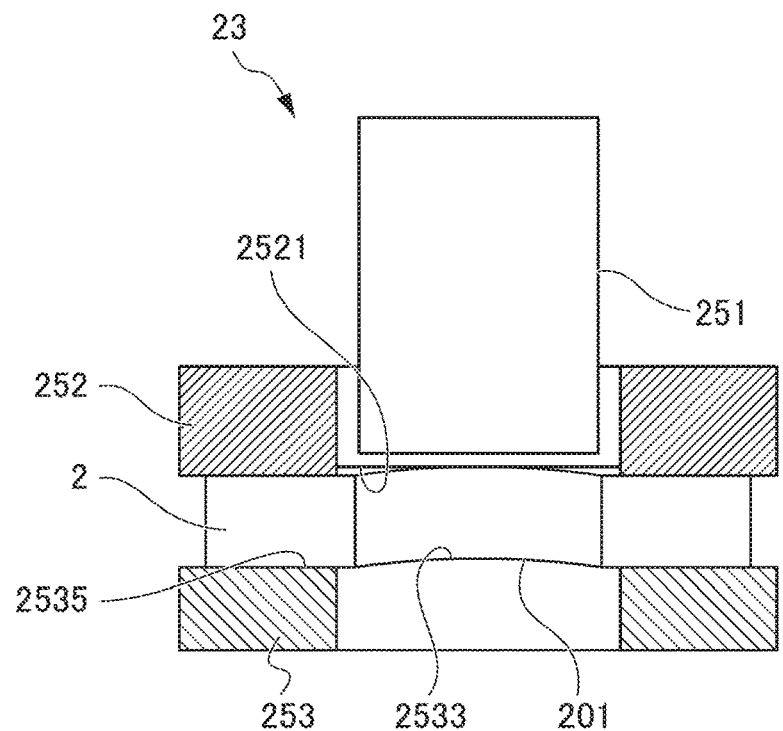
FIG. 5 is a schematic sectional view illustrating a state before peeling an insulating film by a peeling die of a first peeling section of a coil segment manufacturing apparatus according to an embodiment of the present invention.

The pressing member 252 is arranged to face the die 253 and is driven by the die drive unit 24 to be relatively separable/approachable with respect to the die 253. When the pressing member 252 approaches the die 253 to clamp the conductive wire material 2 with the die 253, the conductive wire material 2 is fixed to the die 253 and the pressing member 252. A die lower-surface concave portion 2521 is formed in the lower surface of the pressing member 252 and in a portion facing a convex portion 2533 of the die 253 described below, the die lower-surface concave portion 2521 being depressed upward, that is, to the upstream side in the moving direction of the peeling blades 251 of when the peeling blades 251 as cutting blades peel the insulating film 8, as illustrated in FIG. 5 and the like.

Further, a pair of through holes 2522 is formed in the pressing member 252. A pair of through holes 2531 is also formed in portions of the die 253, the portions facing the pair of through holes 2522 of the pressing member 252. The pair of through holes 2531 of the die 253 faces the through hole 2551 of the spacer 254 and the die set 255. The pair of through holes 2531 of the die 253 has a positional relationship to overlap both side surfaces of the conductive wire material 2 fed from the width-direction correction unit 17 in plan view. The overlapping amount is larger than the thickness of the insulating film 8 on both the side surfaces of the conductive wire material 2. With the configuration, when the peeling blades 251 are lowered from above and inserted into the pair of through holes 2531 of the die 253, as described below, the insulating film 8 on the third side surface 5 and the fourth side surface 6 is peeled together with a part of the conductive portion 7 by the peeling blades 251.

Figure 6:
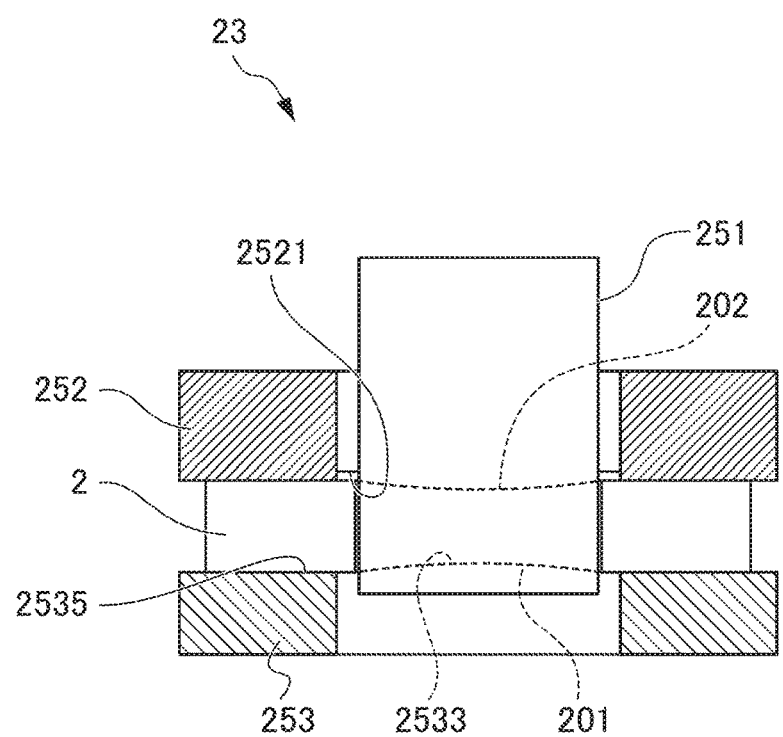
FIG. 6 is a schematic sectional view illustrating a state immediately after lowering the peeling blades of a peeling die of a first peeling section of a coil segment manufacturing apparatus according to an embodiment of the present invention to peel an insulating film.
Figure 7:
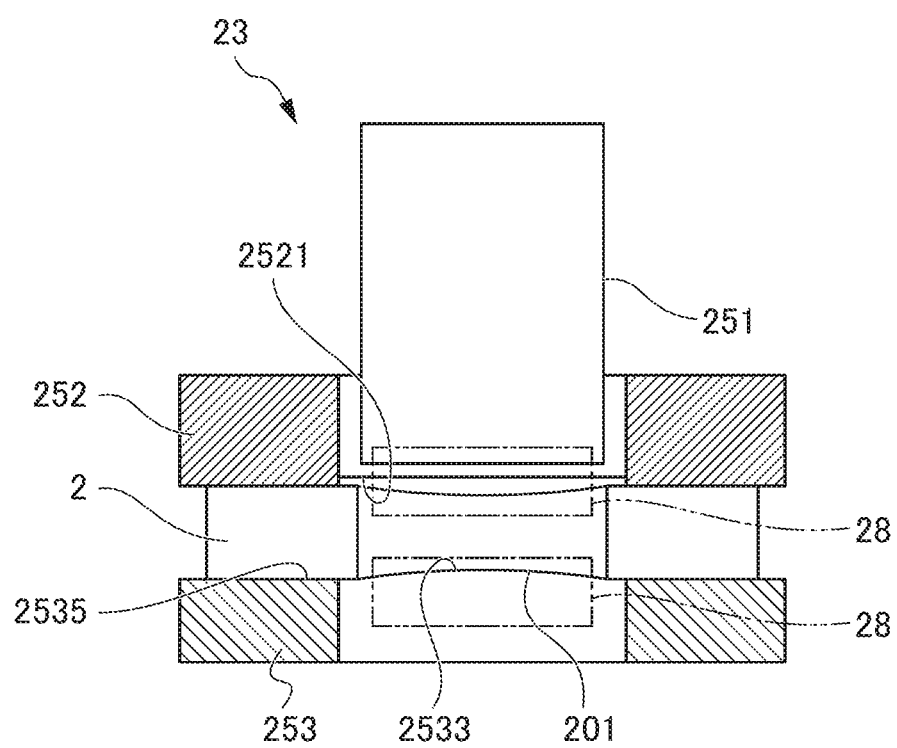
FIG. 7 is a schematic sectional view illustrating a state of raising the peeling blades of a peeling die of a first peeling section of a coil segment manufacturing apparatus according to an embodiment of the present invention after lowering the peeling blades to peel an insulating film.

The convex portion 2533 is provided in the portion between the pair of through holes, and in a conductive wire material contact surface 2535 that is the portion where the conductive wire material 2 fed from the width-direction correction unit 17 is arranged to face and come in contact with the upper surface of the die 253. As illustrated in FIGS. 5 to 7, the convex portion 2533 is gently curved upward and protrudes toward the conductive wire material 2 from the upstream side end to the downstream side end of the pair of through holes 2531 of the die 253, in the feed direction into which the conductive wire material 2 is fed. A portion of the convex portion 2533, the portion being at a central position between the upstream side end and the downstream side end of the pair of through holes 2531 of the die 253 in the feed direction into which the conductive wire material 2 is fed, protrudes mostly upward.

The peeling blades 251 are inserted into the pair of through holes 2522 of the pressing member 252, and are driven by the die drive unit 24, thereby to advance or retreat in the pair of through holes 2522 of the pressing member 252, the pair of through holes 2531 of the die 253, the through hole (not illustrated) of the spacer 254, and the through hole 2551 of the die set 255.

Next, a method of peeling the insulating film 8 will be described. FIG. 5 is a schematic sectional view illustrating a state before peeling the insulating film 8 by the peeling die 23 of the first peeling section 21 of the coil segment manufacturing apparatus 1 according to an embodiment of the present invention. FIG. 6 is a schematic sectional view illustrating a state immediately after lowering the peeling blades 251 of the peeling die 23 of the first peeling section 21 of the coil segment manufacturing apparatus 1 according to an embodiment of the present invention to peel the insulating film 8. FIG. 7 is a schematic sectional view illustrating a state of raising the peeling blades 251 of the peeling die 23 of the first peeling section 21 of the coil segment manufacturing apparatus 1 according to an embodiment of the present invention 1 after lowering the peeling blades 251 to peel the insulating film 8.

The peeling method includes a first peeling process and a second peeling process. In the first peeling process, the peeling blades 251 as a pair of cutting blades are moved and lowered downward that is the direction perpendicular to the axial direction of the conductive wire material 2 to peel at once the insulating film 8 on the third side surface 5 and the fourth side surface 6 of the conductive wire material 2.

To be specific, first, the conductive wire material 2 fed from the width-direction correction unit 17 is arranged to face the upper surface of the die 253 illustrated in FIG. 4. That is, the conductive wire material 2 is arranged above the die 253 having the convex portion 2533 in the conductive wire material contact surface 2535, and the second side surface 4 of the conductive wire material 2 is supported by the die 253 from the downstream side in the moving direction of the peeling blades 251, that is, from the lower side. Next, as illustrated in FIG. 5, the conductive wire material 2 is pressed by the pressing member 252 that regulates movement of the conductive wire material 2 from the upper side as the side facing the die 253. With the pressing, the conductive wire material 2 is positioned with respect to the die 253 and the pressing member 252. At this time, the portion of the conductive wire material 2, the portion being pressed against the convex portion 2533, is deformed. A lower portion of the portion is formed into an upward concave portion 201 gently depressed and curved upward along the shape of the convex portion 2533 and is deformed. An upper portion of the portion is curved and deformed to gently protrude in the upward direction, and enters the die lower-surface concave portion 2521.

Next, the peeling blades 251 are lowered to peel the insulating film 8 on the third side surface 5 and the fourth side surface 6 by the peeling blades 251 in a way to cut the insulating film 8 together with a part of the conductive portion 7. At this time, the conductive wire material 2 is pressed against the convex portion 2533 with the lowering of the peeling blades 251, and thus is pressed and deformed upward as the direction opposite to downward as the moving direction of the peeling blades 251 at the time of cutting by the peeling blades 251. To be specific, the conductive wire material 2 is further deformed along the shape of the convex portion 2533. In this way, the insulating film 8 on the third side surface 5 and the fourth side surface 6 of the conductive wire material 2 is peeled while the conductive wire material 2 is deformed along the shape of the convex portion 2533.

With the process, a downward concave portion 202 gently depressed downward is formed in an upper portion of the portion of the conductive wire material 2, where peeling of the insulating film 8 has been made, with the lowering of the peeling blades 251, as illustrated in FIG. 6. Meanwhile, the upward concave portion 201 gently depressed upward is formed in a lower portion of the portion of the conductive wire material 2, where peeling of the insulating film 8 has been made, by the convex portion 2533, as illustrated in FIG. 6. That is, the portion of the conductive wire material 2, where peeling of the insulating film 8 has been made, is prevented from having a biased shape from the axial center of the conductive wire material 2 in the up and down direction, and has a symmetrical shape in the up and down direction with respect to the axial center of the conductive wire material 2.

Then, the die drive unit 24 moves the peeling blades 251 to a top dead point. The above is the first peeling process.

Next, the second peeling process is performed. In the second peeling process, the insulating film 8 on the first side surface 3 and the second side surface 4 of the same portion as the portion of the conductive wire material 2, where peeling of the insulating film 8 by the first peeling process has been made, is peeled at once. To be specific, first, the fourth side surface 6 of the conductive wire material 2 is brought to a state of being supported by the die (not illustrated) from the downstream side in the moving direction of the peeling blades 28 at the time of cutting by the peeling blades 28. Then, the two peeling blades 28 are moved in a horizontal direction as the direction perpendicular to the axial direction of the conductive wire material 2 along the first side surface 3 and the second side surface 4 of the conductive wire material 2, thereby to peel at once the insulating film 8 in such a way to cut off the insulating film 8 in the corresponding portions on the first side surface 3 and the second side surface 4. At this time, as illustrated in FIG. 7, the conductive wire material 2 has a symmetrical shape in the up and down direction, and thus the peeling blades 28 nearly uniformly come into contact with upper and lower portions of the conductive wire material 2. Therefore, occurrence of remaining of the insulating film in the second peeling process is prevented.

According to the present embodiment, the following effects are exhibited. In the present embodiment, the conductive wire material 2 has a quadrilateral cross-section, and includes the first side surface 3 and the second side surface 4 respectively corresponding to one pair of opposite sides of the quadrilateral and the third side surface 5 and the fourth side surface 6 respectively corresponding to the other pair of opposite sides. The peeling apparatus (coat peeling section 12) that peels the insulating film 8 of the conductive wire material 2 constituted by the electrical conductor (conductive portion 7) coated with the insulating film 8 includes the peeling die 23 as the first peeling die and the peeling die 26 as the second peeling die. The peeling die 23 peels at once the insulating film 8 on the third side surface 5 and the fourth side surface 6 of the conductive wire material 2. The peeling die 26 is installed downstream of the peeling die 23 in the feed direction into which the conductive wire material 2 is fed, and peels at once the insulating film 8 on the first side surface 3 and the second side surface 4 of the same portion as the portion of the conductive wire material 2 where peeling of the insulating film 8 by the peeling die 23 has been made. The peeling die 23 and the peeling die 26 respectively include the pair of cutting blades (the peeling blades 251 and the peeling blades 28), and the support die (die 253). The pair of cutting blades is moved in the direction perpendicular to the axial direction of the conductive wire material 2, and cuts the insulating film 8 to peel the insulating film 8. The support die supports the side surface of the conductive wire material 2 from the downstream side in the moving direction of the cutting blades at the time of cutting by the cutting blades. The die 253 of the peeling die 23 includes the convex portion 2533 protruding toward the conductive wire material 2.

When the insulating film 8 on the two facing surfaces of the conductive wire material 2 is peeled at once, the conductive wire material 2 is pulled in the moving direction of the peeling blades 251, and the downward concave portion 202 depressed in the moving direction of the peeling blades 251 is formed in the conductive wire material 2. Therefore, the conductive wire material 2 becomes a conductive wire material 2 having a shape biased with respect to the axial center of the conductive wire material 2 in such a manner to include the downward concave portion 202 in a certain surface and a plane in a surface facing the certain surface. If the conductive wire material 2 has a shape biased with respect to the axial center, the portion where the concave portion is formed does not come into contact with the peeling blades 251, and the insulating film 8 on the portion is not peeled and the film remains when other two surfaces where the insulating film 8 has not yet been peeled are peeled in the next process.

However, with the configuration, the insulating film 8 is peeled while the conductive wire material 2 is supported by the die 253 including the convex portion 2533 in the peeling die 23, whereby the concave portions (the downward concave portion 202 and the upward concave portion 201) are formed at both the downstream side (lower side) and the upstream side (upper side) of the conductive wire material 2 in the moving direction of the peeling blades 251 as cutting blades, and the insulating film 8 on the other two surfaces can be peeled in a symmetrical shape with respect to the axial center of the conductive wire material 2. Therefore, the peeling blades 28 uniformly come into contact with the conductive wire material 2 when the insulating film 8 on the other two side surfaces is peeled by the peeling die 26 as the second peeling die, and thus any remaining of the film can be eliminated.

Further, the convex portion 2533 has a shape curved toward the conductive wire material 2. With the shape, the upward concave portion 201 formed in the conductive wire material 2 can be made into a curved shape by the convex portion 2533. Therefore, the conductive wire material 2 can be made into a shape symmetrically curved with respect to the axial center of the conductive wire material 2, and the cutting of the insulating film 8 by the peeling blades 251 can be facilitated.

Further, in the present embodiment, the conductive wire material 2 has a quadrilateral cross-section, and includes the first side surface 3 and the second side surface 4 respectively corresponding to one pair of opposite sides of the quadrilateral, and the third side surface 5 and the fourth side surface 6 respectively corresponding to the other pair of opposite sides. The method of peeling the insulating film 8 of the conductive wire material 2 constituted by the electrical conductor (conductive portion 7) coated with the insulating film 8 includes the first peeling process and the second peeling process. The first peeling process is to move the peeling blades 251 as a pair of cutting blades in the direction perpendicular to the axial direction of the conductive wire material 2 and peel at once the insulating film 8 on the third side surface 5 and the fourth side surface 6 of the conductive wire material 2. The second peeling process is to peel at once the insulating film 8 on the first side surface 3 and the second side surface 4 of the same portion as the portion of the conductive wire material 2, where peeling of the insulating film 8 by the first peeling process has been made, after the first peeling process. In the first peeling process, the insulating film 8 is peeled while the conductive wire material 2 is pressed and deformed toward the opposite direction to the moving direction of the peeling blades 251 at the time of cutting by the peeling blades 251.

Therefore, in the first peeling process, the insulating film 8 is peeled while the conductive wire material 2 is pressed and deformed in the opposite direction to the moving direction of the peeling blades 251, and thus even if the conductive wire material 2 is pulled by the peeling blades 251 and the concave portion (downward concave portion 202) depressed in the moving direction of the cutting blades is formed in the conductive wire material 2, the formation of the downward concave portion 202 is suppressed by the amount of the conductive wire material 2 pressed and deformed toward the opposite direction to the moving direction of the peeling blades 251, and the surface facing the downward concave portion 202 has the concave portion (upward concave portion 201) formed by the pressed amount. Therefore, conductive wire material 2 having a symmetrical shape with respect to the axial center of the conductive wire material 2 can be formed. With the configuration, the peeling blades 28 uniformly come into contact with the conductive wire material 2 when the insulating film 8 on the other two side surfaces is peeled in the second peeling process, and any remaining of the film can be eliminated.

In the present embodiment, in the first peeling process, the conductive wire material 2 is arranged on the support die (die 253) having the convex portion 2533 in the conductive wire material contact surface 2535, the conductive wire material 2 is pressed by the pressing member 252 that regulates the movement of the conductive wire material 2 from the side facing the die 253, and the insulating film 8 on the third side surface 5 and the fourth side surface 6 of the conductive wire material 2 is peeled while the conductive wire material 2 is deformed along the shape of the convex portion 2533.

With the process, peeling is performed in the state where the conductive wire material 2 is fixed between the convex portion 2533 provided in the die 253 and the pressing member 252, and thus there is no position aberration of the conductive wire material 2 with respect to the peeling blades 251 as cutting blades, and accurate peeling of the insulating film 8 can be performed. Further, the configuration to press the conductive wire material 2 against the convex portion 2533 of the die 253 by the pressing member 252 is employed. Therefore, the conductive wire material 2 can be deformed into the shape along the convex portion 2533 with the simple structure.

Further, the convex portion 2533 has a shape curved toward the conductive wire material 2. Therefore, the upward concave portion 201 formed in the conductive wire material 2 can be made into a curved shape by the convex portion 2533 in the first peeling process. Therefore, the conductive wire material 2 can be made into a shape symmetrically curved with respect to the axial center of the conductive wire material 2 in the first peeling process, and the cutting of the insulating film 8 by the peeling blades 251 can be facilitated.

The present invention is not limited to the above-described embodiments, and modifications, improvements, and the like within the scope where the objective of the present invention can be achieved are included in the present invention. For example, the conductive wire material 2 may be cut into a predetermined length in advance, the insulating film 8 on one pair of side surfaces is peeled from the cut conductive wire material 2, and then the conductive wire material 2 may be rotated around the axial center of the conductive wire material 2, and the insulating film 8 on the other pair of side surfaces where the insulating film has not yet been peeled may be peeled. With such a configuration, the moving direction of the peeling blades as cutting blades can be the same between the case where the insulating film is peeled from one pair of side surfaces and the case where the insulating film is peeled from the other pair of side surfaces.

Further, the configuration of the sections and units of the peeling apparatus and the processes in the peeling method are not limited to the configuration of the sections and units and the processes in the peeling method in the present embodiment.

EXPLANATION OF REFERENCE NUMERALS

1 Coil segment manufacturing apparatus
2 Conductive wire material
3 First side surface
4 Second side surface
5 Third side surface
6 Fourth side surface
7 Conductive portion
8 Insulating film
23 Peeling die (first peeling die)
26 Peeling die (second peeling die)
28 Peeling blade (cutting blade)
251 Peeling blade (cutting blade)
252 Pressing member
253 Die (support die)
2533 Convex portion

What is claimed is:

1. A peeling apparatus that peels an insulating film of a conductive wire material constituted by an electrical conductor coated with the insulating film,
the conductive wire material having a quadrilateral in cross-section, and including a first side surface and a second side surface respectively corresponding to one pair of opposite sides of the quadrilateral, and a third side surface and a fourth side surface respectively corresponding to the other pair of opposite sides, the peeling apparatus comprising:

a first peeling die that peels at once the insulating film on the third side surface and the fourth side surface of the conductive wire material; and a second peeling die installed downstream of the first peeling die in a feed direction into which the conductive wire material is fed, and which peels at once the insulating film on the first side surface and the second side surface of the same portion as the portion of the conductive wire material, the portion where peeling of the insulating film by the first peeling die has been made, wherein the first peeling die and the second peeling die respectively include a pair of cutting blades that peels the insulating film by being moved in a direction perpendicular to an axial direction of the conductive wire material to cut the insulating film, and a support die that supports a side surface of the conductive wire material from a downstream side in a moving direction of the cutting blades at the time of cutting by the cutting blades, and a portion of the support die of the first peeling die includes a convex portion protruding toward the conductive wire material, wherein the portion of the support die corresponds to the portion of the conductive wire material across which the pair of the cutting blades moves and from which the insulating film has been peeled.

2. The peeling apparatus according to claim 1, wherein the convex portion has a shape curved toward the conductive wire material.

3. A peeling method of peeling an insulating film of a conductive wire material constituted by an electrical conductor coated with the insulating film, the conductive wire material having a quadrilateral cross-section, and including a first side surface and a second side surface respectively corresponding to one pair of opposite sides of the quadrilateral, and a third side surface and a fourth side surface respectively corresponding to the other pair of opposite sides, the peeling method comprising:

a first peeling process of moving a pair of cutting blades in a direction perpendicular to an axial direction of the conductive wire material to peel at once the insulating film on the third side surface and the fourth side surface of the conductive wire material; and a second peeling process of peeling at once the insulating film on the first side surface and the second side surface of a same portion as a portion of the conductive wire material, the portion where peeling of the insulating film by the first peeling process has been made, after the first peeling process, and in the first peeling process, peeling the insulating film while pressing and deforming a portion of the conductive wire material across which the pair of the cutting blades moves and from which the insulating film has been peeled, toward an opposite direction to a moving direction of the cutting blades in cutting by the cutting blades.

4. The peeling method according to claim 3, comprising:

in the first peeling process, arranging the conductive wire material on a support die including a convex portion in a conductive wire material contact surface;

pressing the conductive wire material by a pressing member that regulates movement of the conductive wire material from a side facing the support die; and peeling the insulating film on the third side surface and the fourth side surface while deforming the conductive wire material along a shape of the convex portion.

5. The peeling method according to claim 4, wherein the convex portion has a shape curved toward the conductive wire material.

* * * * *